(12) United States Patent
Soni et al.

(10) Patent No.: US 9,686,274 B2
(45) Date of Patent: Jun. 20, 2017

(54) INFORMED IMPLICIT ENROLLMENT AND IDENTIFICATION

(71) Applicant: Microsoft Corporation, Redmond, WA (US)

(72) Inventors: Himanshu Soni, Surrey (CA); Vijay Bharadwaj, Sammamish, WA (US); Arthur H. Baker, Redmond, WA (US); Gopinathan Kannan, Redmond, WA (US); Ryan Segeberg, Covington, WA (US); Nelly Porter, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/052,682

(22) Filed: Oct. 11, 2013

(65) Prior Publication Data

US 2015/0106891 A1    Apr. 16, 2015

(51) Int. Cl.
*G06F 7/04*     (2006.01)
*H04L 29/06*    (2006.01)
*G06F 21/32*    (2013.01)
*H04L 9/32*     (2006.01)

(52) U.S. Cl.
CPC .......... *H04L 63/0861* (2013.01); *G06F 21/32* (2013.01); *H04L 9/3231* (2013.01)

(58) Field of Classification Search
CPC .... G06F 21/32; H04L 63/0861; H04L 9/3231
USPC ........ 713/186; 382/115, 124; 340/5.82, 5.52
See application file for complete search history.

(56) References Cited

U.S. PATENT DOCUMENTS

| | | | |
|---|---|---|---|
| 6,766,040 B1 | 7/2004 | Catalano et al. | |
| 6,970,584 B2 | 11/2005 | O'Gorman et al. | |
| 7,218,202 B2 | 5/2007 | Bacchiaz et al. | |
| 7,616,784 B2 * | 11/2009 | Kocher | G06K 9/00906 |
| | | | 382/115 |
| 7,616,787 B2 | 11/2009 | Boshra | |
| 7,689,832 B2 | 3/2010 | Talmor et al. | |
| 7,948,361 B2 | 5/2011 | Bennett et al. | |
| 8,150,108 B2 | 4/2012 | Miller | |
| 8,325,994 B2 | 12/2012 | Davida | |
| 8,368,510 B2 | 2/2013 | Luckhardt | |
| 2003/0101349 A1 * | 5/2003 | Wang | H04L 9/32 |
| | | | 713/186 |
| 2003/0182119 A1 * | 9/2003 | Junqua et al. | 704/246 |

(Continued)

FOREIGN PATENT DOCUMENTS

WO    0205077 A2    1/2002

OTHER PUBLICATIONS

Prabhakar, et al., "Biometric Recognition: Security and Privacy Concerns", In IEEE Security and Privacy, vol. 1, Issue 2, Mar. 2003, 10 pages.

(Continued)

*Primary Examiner* — Techane Gergiso
(74) *Attorney, Agent, or Firm* — Timothy Churna; Dan Choi; Micky Minhas

(57) ABSTRACT

In one embodiment, a user login device may create a user identifier template 400 for identifying a user by implicitly capturing one or more biometric identifier readings. A user login device may capture an enrollment biometric identifier reading of a user during an operational user action. The user login device may apply the enrollment biometric identifier reading in creating a user identifier template 400.

20 Claims, 8 Drawing Sheets

(56) References Cited

U.S. PATENT DOCUMENTS

| | | | |
|---|---|---|---|
| 2004/0230843 A1* | 11/2004 | Jansen | G06F 21/36 726/7 |
| 2005/0187883 A1 | 8/2005 | Bishop et al. | |
| 2005/0253683 A1* | 11/2005 | Lowe | G06F 21/32 340/5.53 |
| 2006/0282649 A1* | 12/2006 | Malamud | H04L 63/0861 712/26 |
| 2006/0288234 A1 | 12/2006 | Azar et al. | |
| 2007/0057763 A1 | 3/2007 | Blattner et al. | |
| 2008/0175445 A1* | 7/2008 | Hu | G06K 9/6298 382/118 |
| 2010/0041374 A1* | 2/2010 | Vishik et al. | 455/411 |
| 2010/0162386 A1* | 6/2010 | Li et al. | 726/19 |
| 2011/0083170 A1 | 4/2011 | Kesanupalli et al. | |
| 2011/0221567 A1* | 9/2011 | Lehnert et al. | 340/5.82 |
| 2012/0019379 A1* | 1/2012 | Ben Ayed | G08B 13/1436 340/539.1 |
| 2012/0095763 A1* | 4/2012 | Kuppuswamy et al. | 704/246 |
| 2012/0159599 A1* | 6/2012 | Szoke | G06F 21/35 726/7 |
| 2012/0253953 A1 | 10/2012 | Aziz et al. | |
| 2012/0268241 A1* | 10/2012 | Hanna et al. | 340/5.52 |
| 2012/0290870 A1* | 11/2012 | Shah | G06F 21/10 714/4.11 |
| 2013/0133055 A1* | 5/2013 | Ali et al. | 726/7 |
| 2013/0185790 A1* | 7/2013 | McKeeth | 726/19 |
| 2013/0272586 A1* | 10/2013 | Russo | G06K 9/00087 382/124 |
| 2014/0003681 A1* | 1/2014 | Wright | G06K 9/00013 382/124 |
| 2014/0013405 A1* | 1/2014 | White | H04L 63/0861 726/5 |
| 2014/0123224 A1* | 5/2014 | Nosrati | H04W 12/06 726/3 |
| 2014/0273963 A1* | 9/2014 | Su | H04W 12/06 455/411 |
| 2016/0149905 A1* | 5/2016 | Wang | G06K 9/00281 455/41.2 |

OTHER PUBLICATIONS

"Windows Biometric Framework Overview", Retrieved at: <<http://technet.microsoft.com/en-us/library/hh831396.aspx>>, Feb. 29, 2012, 8 pages.

Soni et al, "Resource Management Based on Biometric Data", U.S. Appl. No. 14/018,680, filed Sep. 5, 2013, 48 pages.

"BioPassword Whitepaper", Available at: <<http://www.infosecurityproductsguide.com/technology/2007/BioPassword_Authentication_ Solutions_Whitepaper_FINAL.pdf>>, Jan. 1, 2006, 11 Pages.

"D 7.12: Behavioural Biometric Profiling and Transparency Enhancing Tools", Available at: <<http://www.fidis.net/fileadmin/fidis/deliverables/fidis-wp7-de17.12_behavioural-biometric_profiling_and_transparency_enhancing_tools.pdf>>, Mar. 4, 2009, pp. 11-21.

"International Search Report and Written Opinion Received for PCT Patent Application No. PCT/US2014/059582", Mailed Date: Jan. 28, 2015, 10 Pages.

"Second Written Opinion Issued in PCT Application No. PCT/US2014/059582", Mailed Date: Sep. 14, 2015, 7 Pages.

Uludag, et al., "Biometric Template Selection and Update: A Case Study in Fingerprints", In Journal Pattern Recognition, vol. 37, Issue 7, Jul. 2004, pp. 1533-1542.

\* cited by examiner

| USER ID 410 | DEVICE ID 420 | BIOMETRIC FEATURE 430 | READING 440 | TIMESTAMP 450 |
|---|---|---|---|---|
| | | | READING 440 | TIMESTAMP 450 |
| | | BIOMETRIC FEATURE 430 | READING 440 | TIMESTAMP 450 |
| | | | READING 440 | TIMESTAMP 450 |
| | DEVICE ID 420 | BIOMETRIC FEATURE 430 | READING 440 | TIMESTAMP 450 |
| | | | READING 440 | TIMESTAMP 450 |
| | | BIOMETRIC FEATURE 430 | READING 440 | TIMESTAMP 450 |
| | | | READING 440 | TIMESTAMP 450 |

INFORMED IMPLICIT ENROLLMENT AND IDENTIFICATION

BACKGROUND

A user may establish a user account on a computing device. The user account may tailor the configuration of an operating system for a specific user. The user account may protect a data file stored by the user on the computing device from other users of the computing device. The user account may enroll a user into various network services, such as an e-mail account, a network resource account, or other network accounts.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to creating a user identifier template for identifying a user by implicitly capturing one or more biometric identifier readings. A user login device may capture an enrollment biometric identifier reading of a user during an operational user action. The user login device may apply the enrollment biometric identifier reading in creating a user identifier template.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 4 illustrates, in a block diagram, one embodiment of a user identifier template.

DETAILED DESCRIPTION

Figure 1:
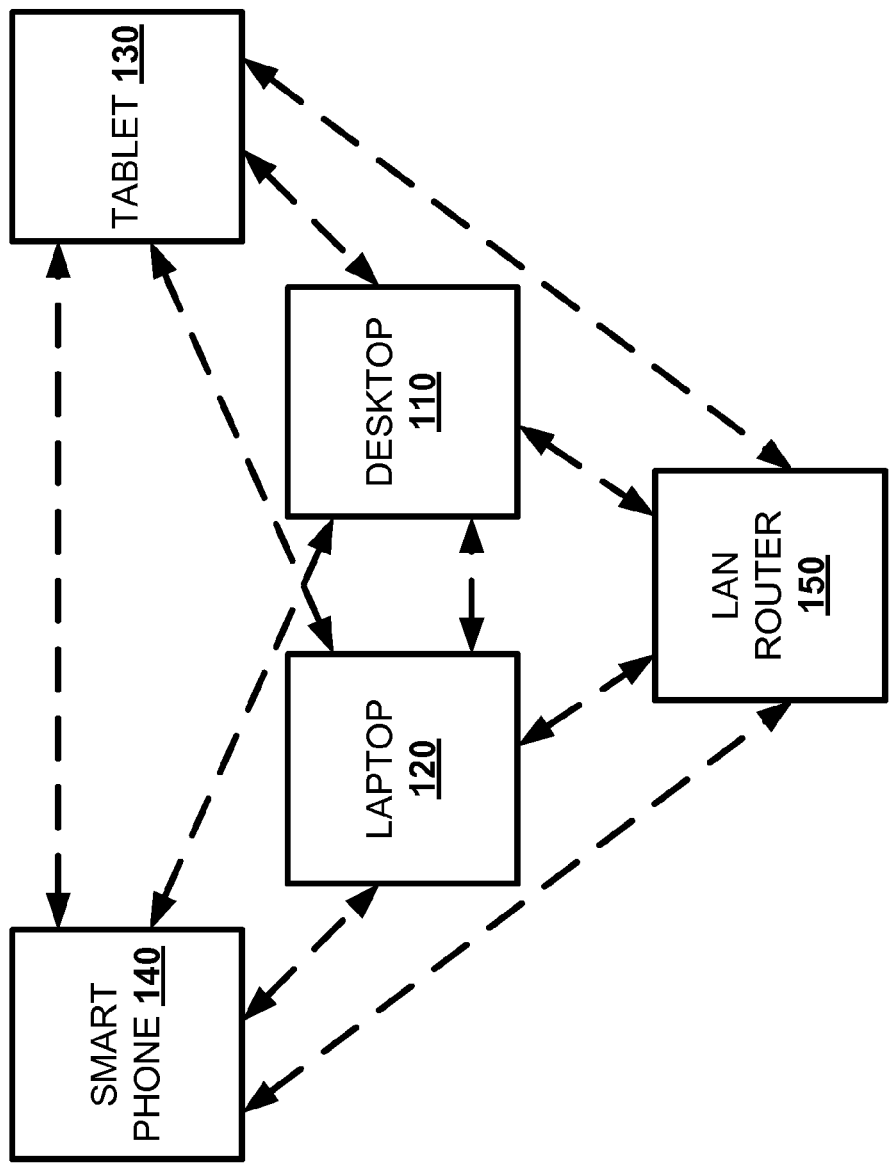
FIG. 1 illustrates, in a block diagram, one embodiment of a personal network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a user login device.

Authentication scenarios, such as a fast sign-in and online purchase approval, may be simplified by allowing a user to identify oneself using a biometric identifier. A biometric identifier is a physical characteristic of a user that the computing device may use to identify the user, such as a fingerprint, voiceprint, retinal scan, facial features, or a heartbeat. Currently, a computing device that has a biometric sensor may, upon the informed consent of the user, create a statistical model, or user identifier template, based on a biometric identifier reading to identify a user.

To create the user identifier template, the user may locate the biometric sensor, launch an enrollment wizard, and explicitly enter in a biometric identifier reading. "Enrollment" refers to the process of creating a user identifier template. Once the enrollment has been completed, the user may use the user identifier template to securely and quickly access a protected feature of the computing device, such as a user account. Locating the biometric sensor may cause difficulty for the user. Further, the enrollment process may have multiple enrollment steps with multiple submissions of the biometric identifier by the user.

A user login device may simplify the use of a biometric identifier login by using an implicit enrollment procedure. In such an implicit enrollment procedure, the user may be informed of the implicit enrollment and be given the opportunity to opt in or opt out in order to preserve user control of private information. Further, the user identifier template may be stored in a secure location, such as trusted platform module, in order to protect the privacy of a user.

A user login device may position a biometric sensor on a computing device at an ergonomic junction, so that a user may naturally touch the sensor during ordinary use of the computing device. For example, a tablet computer may have a biometric sensor embedded in a home button. A home button is a button that presents the home page of a graphical user interface for an operating system to a user. Alternately, a smart phone may have a biometric sensor embedded in the device casing, where a user holding the phone might place an index finger or a thumb. A tablet computer or a smart phone may have a high-sensitivity touch screen capable of collecting a fingerprint sample. Further, a desktop computer or laptop computer may have a biometric sensor embedded in the surface of a mouse, touchpad, or other cursor device.

The host operating system of a user login device may build the user identifier template of the user based on a set of one or more biometric samples, and store this user identifier template for later reference. The user login device may match a new biometric identifier reading from a biometric sensor with the stored user identifier template to determine if the biometric identifier reading came from the user.

The response of the user login device to a new biometric identifier reading may depend on whether the user already has a user identifier template stored on the user login device. If the user has no user identifier templates, the user login device may prompt the user for some other form of identification. For example a user may provide a user login credential, such as a password or personal identification number. Once the user is identified, the user login device may begin collecting biometric identifier readings each time the user interacts with an ergonomic junction biometric sensor. The user login device may time-stamp each biometric identifier reading with the time of its capture. After a predetermined freshness period, the biometric identifier reading may be considered "stale" and discarded without use. Once the user login device has captured a sufficient number of biometric identifier readings, the user login device may use the biometric identifier reading to build a user identifier template for the signed-in user. The login user device may save the user identifier template for later reference.

If the user already has a user identifier template, the user login device may collect a biometric identifier reading when the user interacts with the biometric sensor in the course of an ordinary operational user action. The user login device may attempt to match the biometric identifier reading against the set of stored user identifier templates. If the biometric identifier reading matches the stored user identifier template, the user login device may automatically sign in the user without any additional user login credentials. For example, touching a fingerprint reader may be sufficient to complete the sign-in operation. The biometric login mechanism may provide other kinds of per-user customizations including system recognized authentic user gestures.

The biometric login mechanism may account for multiple biometric features. For example, a signed-in user may touch the fingerprint reader with different fingers. If the fingerprint reader is embedded in the home button of a tablet computer, the user may press the home button with an index finger or thumb, depending on the orientation of the tablet. To avoid combining fingerprint readings from different fingers into a single user identifier template, the user login device may separate unused fingerprint readings into fingerprint groupings based on similarity. The user login device may use fingerprint readings from a single fingerprint group to build a user identifier template. The user login device may group the fingerprint readings using any of the standard information-similarity measures commonly used in pattern recognition systems. The user login device may collect the fingerprint readings in the context of a single signed-in user or in the context of multiple users in a closed group sharing the same device, such as family members. The user login device may use the heuristics of information-distance measure to distinguish between different fingerprint readings. The heuristics of information-distance measure is the measure of the difference between two data clusters.

The user login device may alter a user identifier template received in a migration from other computing devices as an enrollment template. The other computer device may use the enrollment template to create a user identifier template. The migration may be via a secure, out-of-band transfer mechanism, such as through a cloud server or device pairing. With such an arrangement, the user may identify oneself to the second device once, and the enrollment template may migrate to the second device. The migration may further enhance the implicit enrollment experience of the user when setting up a new device.

Thus, in one embodiment, a user login device may create a user identifier template for identifying a user by implicitly capturing one or more biometric identifier readings. A user login device may capture an enrollment biometric identifier reading of a user during an operational user action. The user login device may apply the enrollment biometric identifier reading in creating a user identifier template.

Modern users may have one or more computing devices that may act as a user login device. The user may establish the same user account on each computing device to create a personal network of devices. FIG. 1 illustrates, a block diagram, one embodiment of a personal network 100. A user may have a desktop computer 110, a laptop computer 120, a tablet computer 130, or a smart phone 140, each with varying degrees of computing power. A desktop computer 110 is a stationary multi-component personal computer or workstation that usually receives user input via a mouse and a keyboard. A laptop computer 120 is a folding two-piece mobile personal computer that usually receives user input via a keyboard and a touch pad. A tablet computer 130 is a flat single unit computer that usually receives user input via a touch screen and a home button. A smart phone 140 is a mobile telephone with increased processing capability that usually receives user input via a touch screen, a home button, or a voice activated interface.

Each user login device may connect to each other and to the internet via a local area network (LAN) router 150. Alternately, each user login device may connect directly to each other via a wired or wireless connection, such as Bluetooth®. By connecting to each other, these user login devices may share user account information, such as enrollment templates that may be used to generate user identifier templates for validating access to the user account. A source user login device may adjust the granularity of the enrollment template based on the target user login device receiving the enrollment template.

Figure 2:
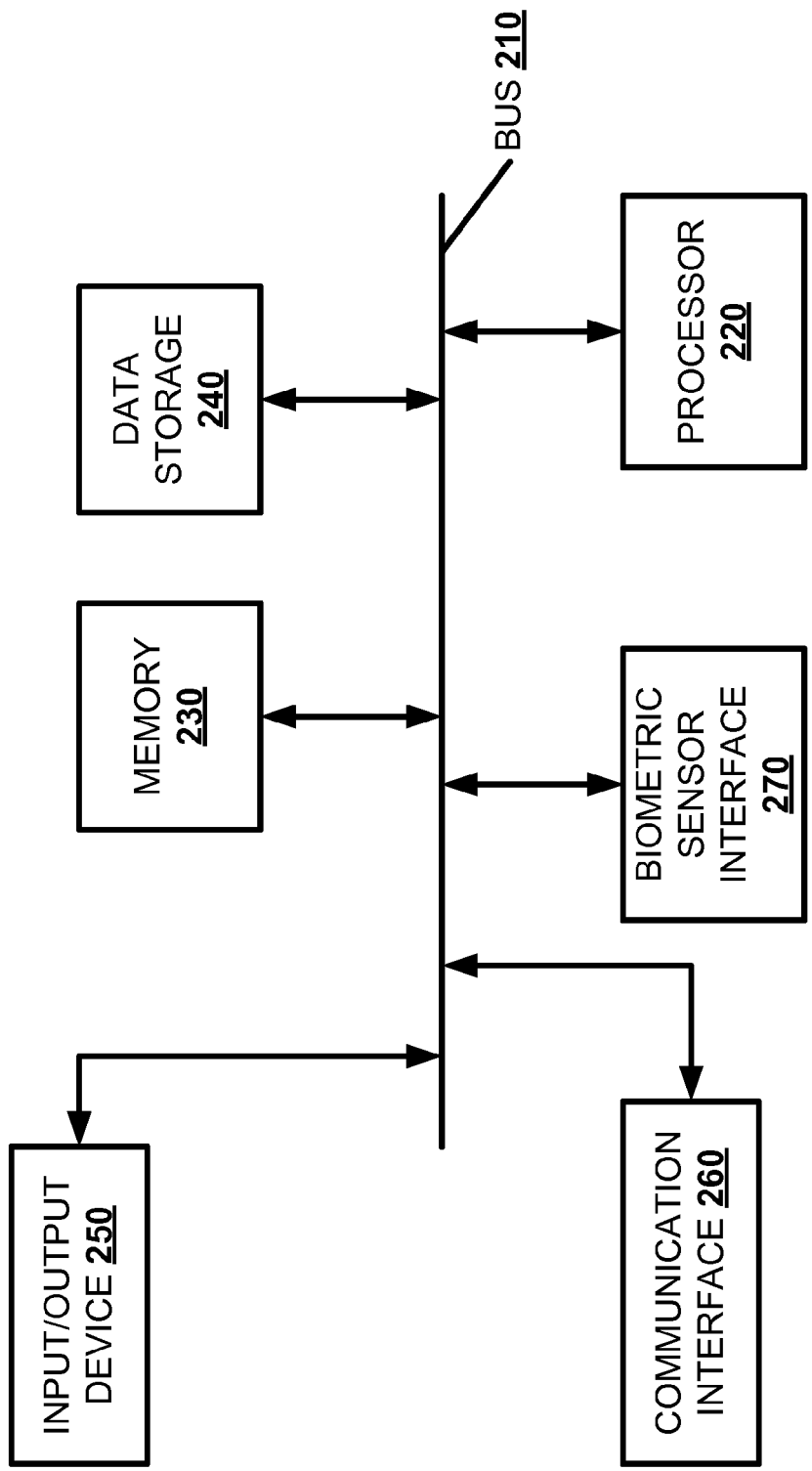
FIG. 2 illustrates, in a block diagram, one embodiment of a computing device.

FIG. 2 illustrates a block diagram of an exemplary computing device 200 which may act as a user login device. The computing device 200 may combine one or more of hardware, software, firmware, and system-on-a-chip technology to implement a user login device. The computing device 200 may include a bus 210, a processor 220, a memory 230, a data storage 240, an input/output device 250, a communication interface 260, and a biometric sensor interface 270. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing a user identifier template. The data storage 240 may have a secure storage location to securely store user identifier templates and other sensitive user information.

The input/output device 250 may include one or more conventional mechanisms that permit a user to input information to the computing device 200, such as a keyboard, a mouse, a voice recognition device, a microphone, a headset, a gesture recognition device, a touch screen, etc. The input/output device 250 may include one or more conventional mechanisms that output information to the user, including a display, a printer, one or more speakers, a headset, or a medium, such as a memory, or a magnetic or optical disk and a corresponding disk drive. The communication interface 260 may include any transceiver-like mechanism that enables computing device 200 to communicate with other devices or networks. The communication interface 260 may include a network interface or a transceiver interface. The communication interface 260 may be a wireless, wired, or optical interface. The biometric sensor interface 270 may receive a biometric identifier reading from one or more biometric sensors ergonomically placed on the user login device. The biometric sensor interface 270 may convert the biometric sensor data to a format readily usable by a computing device 200.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
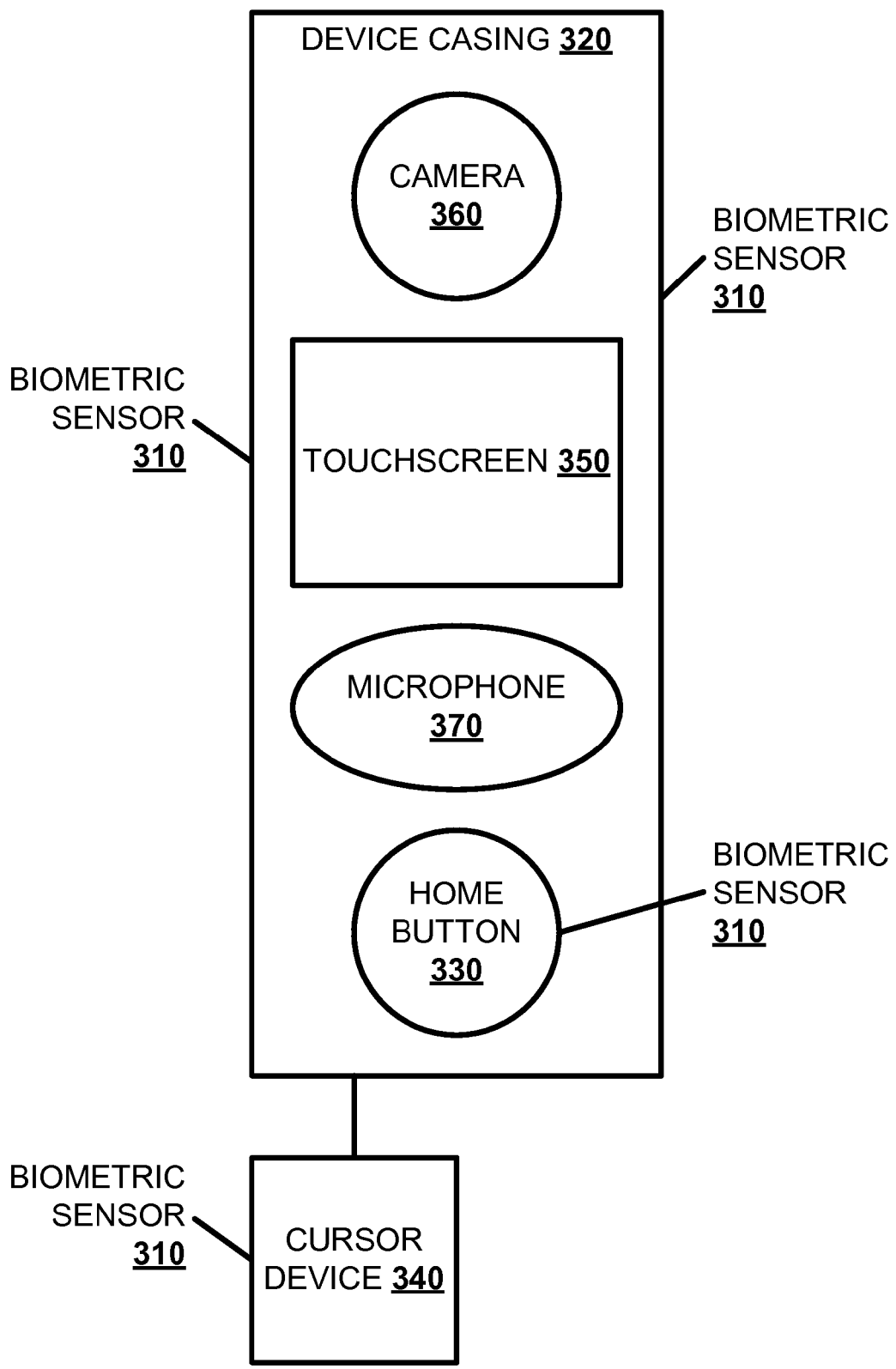
FIG. 3 illustrates, in a block diagram, one embodiment of a biometric sensor configuration.

FIG. 3 illustrates, in a block diagram, one embodiment of a biometric sensor configuration 300. A biometric sensor 310 is a sensor that captures a biometric identifier reading. A biometric identifier reading is a representation of a physical aspect of a user, such as a fingerprint, a voiceprint, a retinal scan, a heartbeat, or a facial feature. A biometric sensor 310 may be placed on the user login device in an ergonomic junction. An ergonomic junction is a physical or virtual location on the user login device that the user interacts with during an operational user action. An operational user action is an action the user takes during the normal course of operation of the user login device, as opposed to an explicit enrollment action. An explicit enrollment action is an action taken strictly to record identifying information about the user. For example, an ergonomic junction biometric sensor 310 may be placed on a device casing 320 to come in contact with the fingertips of the user when holding the user login device. An ergonomic junction biometric sensor 310 may be placed on a home button 330 of a user login device. A home button 330 is a button that returns a user interface of an operating system to a home screen. An ergonomic junction biometric sensor 310 may be placed on a cursor device 340 to come in contact with the fingertips of the user when holding the cursor device 340. The cursor device 340 is a device that controls a cursor in the user interface, such as a mouse or a touch pad. A touchscreen 350 may act as an ergonomic junction biometric sensor 310 by capturing a fingerprint from the user. A camera 360 may act as an ergonomic junction biometric sensor 310 by capturing a retinal scan or a face for interpretation by face-recognition software. A microphone 370 may act as an ergonomic junction biometric sensor 310 by capturing a voice print.

Each ergonomic junction biometric sensor 310 may capture a biometric identifier reading to create a user identifier template for identifying a user based on a biometric feature.

FIG. 4 illustrates, in a block diagram, one embodiment of a user identifier template 400. The user identifier template 400 may have a user identifier (ID) 410 indicating the user account associated with the user identifier template 400. A device identifier 420 may indicate the device that captured the biometric identifier reading, as different devices with different processing capability may provide different levels of granularity. A biometric feature field 430 may indicate the biometric feature that provided the biometric identifier reading. If the biometric identifier is a fingerprint or a retinal scan, the biometric feature field 430 may distinguish between fingers or between a right eye and a left eye. A biometric identifier reading field 440 may store the biometric identifier readings for that biometric feature. A reading timestamp 450 may identify the time that a biometric identifier reading was captured.

Figure 5:
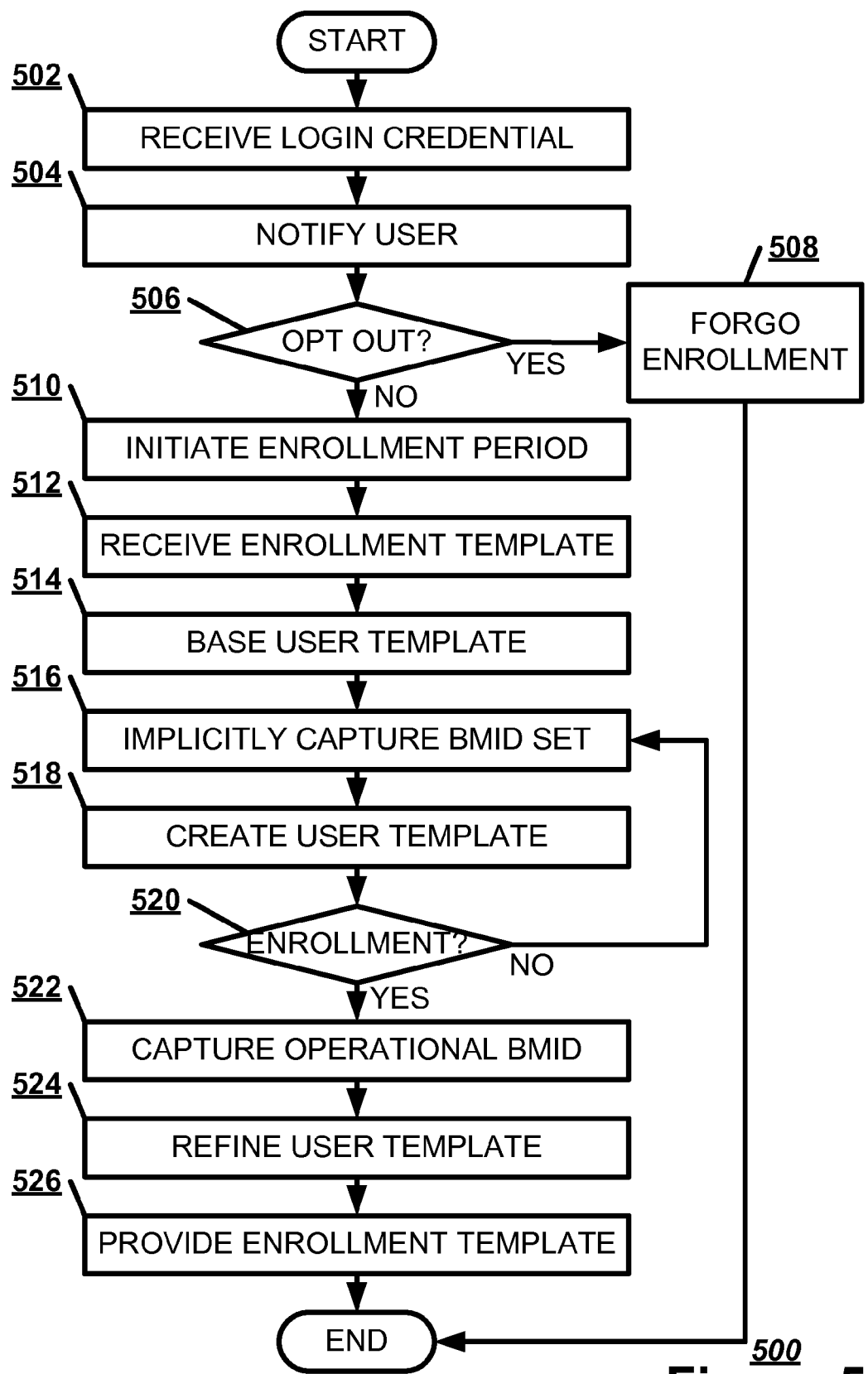
FIG. 5 illustrates, in a flowchart, one embodiment of a method of implicitly enrolling a user.

FIG. 5 illustrates, in a flowchart, one embodiment of a method 500 of implicitly enrolling a user. A user login device may receive a user login credential for a user account from a user as part of an initial user login (Block 502). The user login device may notify a user of an implicit enrollment option (Block 504). If the user has opted out of implicitly creating a user identifier template (Block 506), the user login device may forgo enrollment (Block 508). Otherwise, the user login device may initiate an enrollment period upon an initial user login (Block 510). The user login device may receive an enrollment template for the user from a paired device if one is available (Block 512). A paired device is a computing device that shares a user account with the user login device. The user login device may base a user identifier template 400 on an enrollment template received from the paired device (Block 514). The user login device may implicitly capture an enrollment biometric identifier (BMID) reading set (Block 516). The user login device may create a user identifier template 400 to identify a user based on the enrollment biometric identifier reading set (Block 518). If the enrollment period has ended (Block 520), the user login device may capture an operational biometric identifier reading during an operational period (Block 522). The user login device may refine the user identifier template 400 based on an operational biometric identifier reading captured during an operational period (Block 524). The user login device may provide an improved enrollment template based on the user identifier template 400 to a paired device (Block 526).

Figure 6:
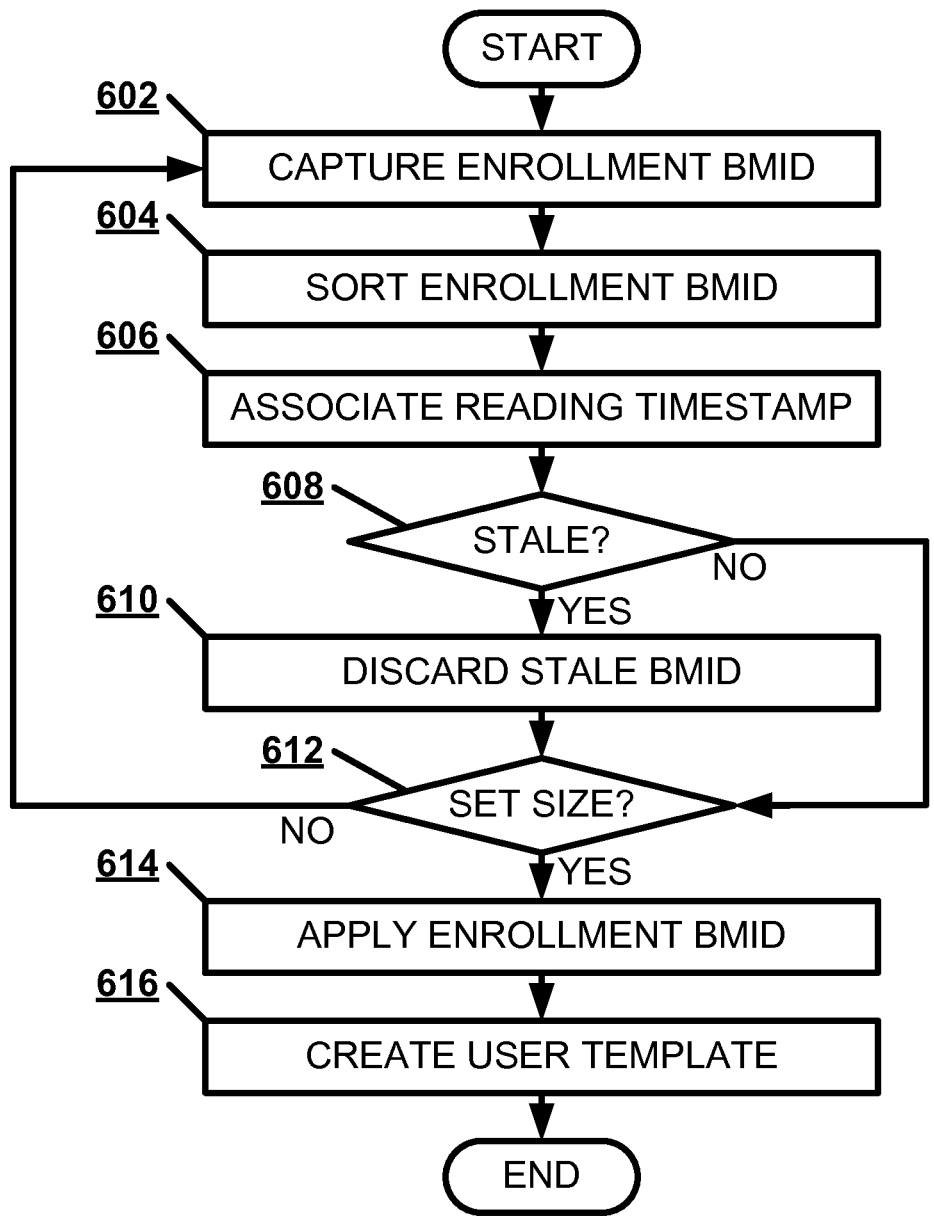
FIG. 6 illustrates, in a flowchart, one embodiment of a method implicitly creating a user identifier template using an enrollment biometric identifier.

FIG. 6 illustrates, in a flowchart, one embodiment of a method 600 implicitly creating a user identifier template 400 using an enrollment biometric identifier reading. The user login device may capture an enrollment biometric identifier reading of a user from an ergonomic junction biometric sensor 310 during an operational user action (Block 602). The user login device may sort the enrollment biometric identifier reading into a biometric identifier grouping (Block 604). The user login device may associate the enrollment biometric identifier reading with a reading timestamp (Block 606). If the user login device detects the reading timestamp for an enrollment biometric identifier reading of the biometric identifier grouping is outside a freshness period, or "stale" (Block 608), the user login device may discard the stale enrollment biometric identifier reading from the biometric identifier grouping (Block 610). If a set size for the biometric identifier grouping at least equals a minimum sample size (Block 612), the user login device may apply the enrollment biometric identifier reading in creating a user identifier template 400 (Block 614). The user login device may create the user identifier template 400 (Block 616).

Figure 7:
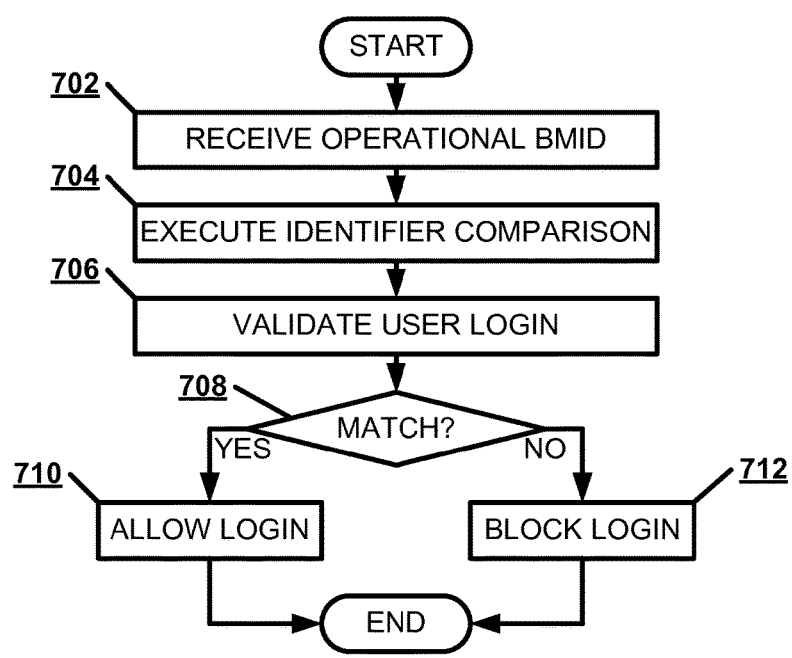
FIG. 7 illustrates, in a flowchart, one embodiment of a method of accessing a user account using an operational biometric identifier.

FIG. 7 illustrates, in a flowchart, one embodiment of a method 700 of accessing a user account using an operational biometric identifier reading. The user login device may receive an operational biometric identifier reading captured during an operational period (Block 702). The user login device may execute an identifier comparison of an operational biometric identifier reading captured during an operational period to the user identifier template 400 (Block 704). The user login device may validate a user login based on the identifier comparison (Block 706). If the operational biometric identifier reading matches the user identifier template 400 (Block 708), the user login device may allow the user to access the user account (Block 710). If the operational biometric identifier reading does not match the user identifier template 400 (Block 708), the user login device may block the user from accessing the user account (Block 712).

Figure 8:
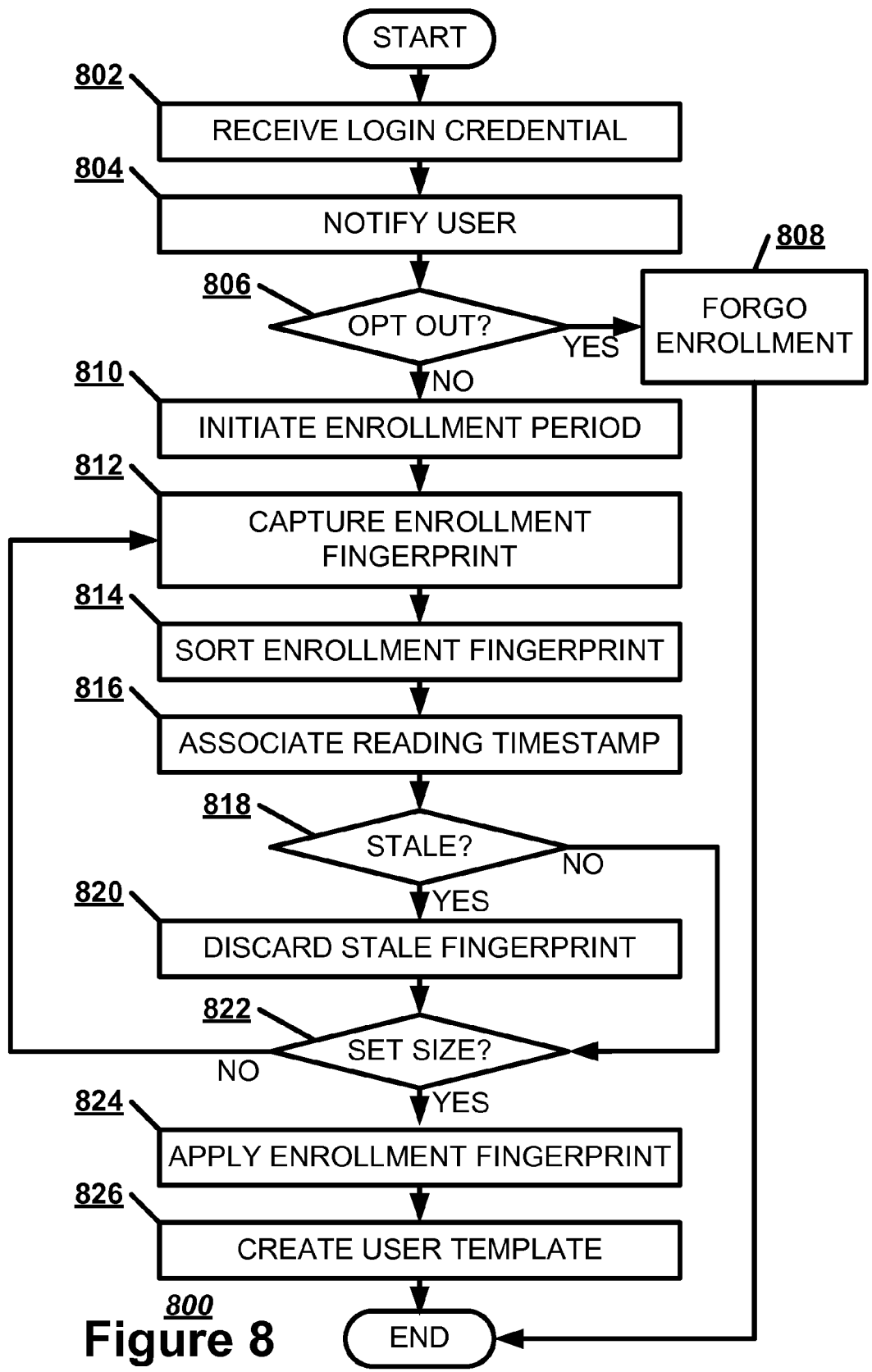
FIG. 8 illustrates, in a flowchart, one embodiment of a method implicitly creating a user identifier template using an enrollment fingerprint reading.

One common type of biometric identifier the user login device may use is a fingerprint. FIG. 8 illustrates, in a flowchart, one embodiment of a method 800 implicitly creating a user identifier template 400 using an enrollment fingerprint reading. A user login device may receive a user login credential for a user account from a user as part of an initial user login (Block 802). The user login device may notify a user of an implicit enrollment option (Block 804). If the user has previously opted out of implicitly creating a user identifier template (Block 806), the user login device may forgo enrollment (Block 808). Otherwise, the user login device may initiate an enrollment period upon an initial user login (Block 810). The user login device may capture an enrollment fingerprint reading of a user from an ergonomic junction fingerprint reader during an operational user action (Block 812). The user login device may sort the enrollment fingerprint reading into a fingerprint grouping (Block 814). The user login device may associate the enrollment fingerprint reading with a reading timestamp (Block 816). If the user login device detects the reading timestamp for an enrollment fingerprint reading of the fingerprint grouping is outside a freshness period, or "stale" (Block 818), the user login device may discard the stale enrollment fingerprint reading from the fingerprint grouping (Block 820). If a set size for the fingerprint grouping at least equals a minimum sample size (Block 822), the user login device may apply the enrollment fingerprint reading in creating a user identifier template 400 (Block 824). The user login device may create the user identifier template 400 (Block 826).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
    receiving in a user login device an enrollment template for a user from a paired device sharing a user account with the user login device to enhance implicit enrollment in the user login device;
    capturing with the user login device an enrollment biometric identifier reading of the user during an operational user action taken during a normal course of operation;
    altering the enrollment template using the enrollment biometric identifier reading to create a user identifier template for the user login device; and
    providing the user identifier template as an improved enrollment template to a new paired device sharing the user account with the user login device to enhance implicit enrollment in the new paired device.

2. The method of claim 1, further comprising:
    receiving a user login credential for a user account.

3. The method of claim 1, further comprising:
    initiating an enrollment period upon an initial user login.

4. The method of claim 1, further comprising:
    executing an identifier comparison of an operational biometric identifier reading captured during an operational period to the user identifier template.

5. The method of claim 4, further comprising:
    validating a user login based on the identifier comparison.

6. The method of claim 1, further comprising:
    refining the user identifier template based on an operational biometric identifier reading captured during an operational period.

7. The method of claim 1, further comprising:
forgoing enrollment when a user has opted out of implicitly creating the user identifier template.

8. The method of claim 1, wherein the enrollment biometric identifier is at least one of a fingerprint, a voiceprint, a retinal scan, a heartbeat, or a facial feature.

9. The method of claim 1, further comprising:
sorting the enrollment biometric identifier reading into a biometric identifier grouping.

10. The method of claim 1, further comprising:
creating the user identifier template once a set size for a biometric identifier grouping at least equals a minimum sample size.

11. The method of claim 1, further comprising:
associating the enrollment biometric identifier reading with a reading timestamp.

12. The method of claim 1, further comprising:
discarding a stale enrollment biometric identifier reading from a biometric identifier grouping if a reading timestamp is outside a freshness period.

13. A computing device, comprising:
one or more processors; and
memory to store a set of instructions detailing a method stored thereon that when executed by the one or more processors cause the one or more processors to perform the method, the method comprising:
  receiving an enrollment template for a user from a paired device sharing a user account with the computing device to enhance implicit enrollment in the computing device;
  capturing an enrollment fingerprint reading of the user from an ergonomic junction fingerprint reader placed at a location on the computing device that the user interacts with during an operational user action taken during a normal course of operation to capture the enrollment fingerprint reading during the operational user action;
  altering the enrollment template using the enrollment fingerprint reading to create a user identifier template for the computing device; and
  providing the user identifier template as an improved enrollment template to a new paired device sharing the user account with the computing device to enhance implicit enrollment in the new paired device.

14. The computing device of claim 13, wherein the method further comprises:
receiving a user login credential for a user account.

15. The computing device of claim 13, wherein the method further comprises:
initiating an enrollment period upon an initial user login.

16. The computing device of claim 13, wherein the method further comprises:
sorting the enrollment fingerprint reading into a fingerprint grouping.

17. The computing device of claim 13, wherein the method further comprises:
creating the user identifier template once a set size for a fingerprint grouping at least equals a minimum sample size.

18. The computing device of claim 13, wherein the method further comprises:
discarding a stale enrollment fingerprint reading from a fingerprint grouping if a reading timestamp is outside a freshness period.

19. A user login device, comprising:
a biometric sensor interface configured to receive an enrollment biometric identifier reading of a user from an ergonomic junction biometric sensor placed at a location on the user login device that the user interacts with during an operational user action taken during a normal course of operation to capture the enrollment biometric identifier reading during the operational user action; and
a data storage configured to store securely a user identifier template created from the enrollment identifier reading;
a processor configured to alter an enrollment template using the enrollment identifier reading to create the user identifier template for the user login device and to execute an identifier comparison of an operational biometric identifier reading captured by the ergonomic junction biometric sensor during an operational period to the user identifier template to validate a user login; and
a communication interface configured to receive the enrollment template from a paired device sharing a user account with the user login device and to provide the user identifier template as an improved enrollment template to a new paired device sharing the user account with the user login device to enhance implicit enrollment in the new paired device.

20. The user login device of claim 19, wherein the ergonomically-placed biometric sensor is located in at least one of a touch screen, a cursor device, a home button, and a device casing.

* * * * *